United States Patent Office
3,847,882
Patented Nov. 12, 1974

3,847,882
HYDROXY-TERMINATED COPOLYMERS OF
BUTADIENE AND ACRYLATES
Mart G. Baldwin, Newtown, Pa., and Samuel F. Reed, Jr., Huntsville, Ala., assignors to the United States of America as represented by the Secretary of the Army
No Drawing. Original application Nov. 25, 1969, Ser. No. 886,605. Divided and this application Aug. 19, 1971, Ser. No. 173,282
Int. Cl. C08f 15/02
U.S. Cl. 260—83.5                                 2 Claims

ABSTRACT OF THE DISCLOSURE

Copolymers of ferrocenyl methyl acrylate (FMA) and butadiene are disclosed along with the pertinent preparative procedures therefor. The specified copolymers serve as the propellant binder and catalyst for composite propellant composition containing ammonium perchlorate, plasticizer, and aluminum metal fuel.

CROSS-REFERENCE TO RELATED APPLICATION

This is a division of application Ser. No. 886,605, filed Nov. 25, 1969.

BACKGROUND OF THE INVENTION

Well known in the propellant field is the fact that the burning rate of many solid propellants can be increased by the introduction of certain iron containing additives. Ferrocene, an iron containing organic compound, has been used as an additive. Many ferrocene derivatives have been utilized as additives for the purpose of increasing the burning rate of the propellant composition. Usually the ferrocene compounds are in the form of liquids which also serve as plasticizing agents. In the liquid state the ferrocenes display the inherent disadvantages characteristic of liquid additives such as loss by evaporation, migration, etc., and consequently, the propellant systems suffer, particularly on long term storage. The problems associated with liquid additives may be eliminated or reduced by changing the ferrocene-containing additives to a form more suitable for use in this specific application.

An attractive approach to changing the form of the ferrocene-containing additive is to combine the ferrocene additive with the binder being utilized in the propellant system. To change the form of the ferrocene derivative by combining the derivative and a binder material via a polymerization technique into a serviceable prepolymer suitable for propellant mixing and curing is an approach having great merit. The features of a known binder material indicate that such a binder if selected for use with a ferrocene derivative to form a copolymer having a burning rate catalyst as an integral part of the binder, if successful, could provide a prepolymer or copolymer which has immediate utility. The prerequisites suggest that the copolymer should be a liquid and should contain functional groups capable of undergoing a cure reaction to a final rubber-like state.

Therefore, an object of this invention is to provide a copolymer having a catalyst as an integral part thereof which copolymer can be cured to form a binder for propellants as well.

A further object is to provide a copolymer which may be prepared from two monomers by employing hydroxy-containing azo compounds as the initiators.

An additional object is to provide a propellant composition having high burning rates as a direct result of using the binder-catalyst material in the formulation.

SUMMARY OF THE INVENTION

Ferrocenyl methyl acrylate and the basic binder material butadiene are copolymerized when the polymerization reaction in an organic solvent is initiated by an azo compound initiator. The azo compound initiator may be selected from azo-bis-(2-methyl-5-hydroxy-valeronitrile), azo-bis-(2-methyl-3-hydroxypropionitrile), and azo-bis-(hydroxyethyl-2-methyl propionate). The organic solvents may be selected from toluene, dioxane, and dimethyl formamide.

DESCRIPTION OF THE PREFERRED EMBODIMENTS

The copolymers of butadiene and ferrocenyl methyl acrylate (FMA) are prepared in accordance with the general descriptive technique as follows:

To a glass high-pressure reactor (Aerosol tube) is introduced 30 milliliters of dioxane, 2.73 grams (0.01 moles) FMA, and 1.66 grams (0.0066 moles) azo-bis-(2-methyl-5-hydroxy-valeronitrile). The reactor is attached to a vacuum line and deaerated by three alternate freeze-thaw cycles. At this point 10.8 grams (0.2 moles) of butadiene is condensed into the reactor, and the reactor is removed from the vacuum line and placed in an oil bath at 66–67° C. Heating is continued for a period of 72 hours. After cooling, the reactor is vented, the solvent removed by evaporation, and the copolymer reprecipitated by dissolving in ether followed by the addition of methanol. After decanting the solvents, the copolymer is stripped of excess solvents on a rotatory evaporator and finally dried at 70–75° C. under reduced pressure (1 mm.) for a period of 25 hours. The yield of copolymer is 7.0 grams (52%). Evaporation of the decanted solvents gives an additional 5.63 grams of the copolymers containing the low molecular weight copolymer and impurities. The liquid copolymer (methanol insolubles) is characterized by its molecular weight (3900), hydroxy-end group content (1.10 weight percent) and elemental analysis (percent Fe—2.8).

The experimental data for other typical experiments are shown in Table I (below). Butadiene-FMA weight ratios were varied from approximately 1:1 to 19:1. Also the Butadiene-FMA ratio of 1:3 provides a copolymer with higher iron content which is preferred for use in higher burning rate propellants. Copolymerization is conducted in toluene, dioxane, and dimethyl formamide. Azo-bis(2-methyl-5-hydroxy-valeronitrile) is employed as initiator in the major number of reactions. Other initiators which can be used are azo-bis(2-methyl-3-hydroxypropionitrile) and azo-bis(hydroxyethyl-2-methyl propionate). Polymerization temperatures may be conveniently maintained in the range of 60–80° C. Reaction times may vary over the range of 24–120 hours, preferably in the area of 72 hours. Physical characterization data on selected copolymers are given in Table II (below).

Test results on the effect of the FMA contained copolymers on the burning rate of propellant compositions are displayed in Table III (below). Copolymers used in this test work included those containing 5, 10, 15, 20, 25, and up to 75 weight percent FMA. The burning rates of propellant samples utilizing polymers of 5–25 weight percent FMA are compared (in Table III) with a standard propellant composition containing only a polybutadiene binder. The burning rate of the FMA-containing copolymer compositions increases with increased iron content. This fact, increase of burning rate, is consistent with the effect of liquid ferrocene derivatives added in portions of equivalent iron content. These results demonstrate the effectiveness of ferrocene containing binders in increasing the burning rate of solid propellant systems. Copolymers having up to 75 weight percent FMA are preferred for use in propellant compositions wherein higher iron contents are desired. The copolymers having the specified higher concentration of FMA may be used in propellant compositions in predetermined amounts to achieve burning rates of many values since the burning rates of propellants are proportional to the iron content. The iron content in the composition is likewise proportional to the FMA content contained therein. Lesser amounts of the higher FMA content copolymer may be employed where only minimal burning rate increases are desired.

Copolymers with molecular weight ranges from about 1,000 to about 10,000 are easily obtained by varying the reaction conditions, concentrations of reactants, and initiator. Hydroxy-end group content from about 0.1 to about 2.5 weight percent of the copolymer with an iron content of up to about 12 weight percent of the copolymer are obtained by predetermining the reaction conditions and concentrations of reactants and initiators.

TABLE I.—EXPERIMENTAL DATA ON PREPARATION OF BUTADIENE-FMA COPOLYMERS
[Temp. 66–67° C. Time—72 hours]

| No. | Butadiene Grams | Butadiene Moles | FMA Grams | FMA Moles | Comonomer mole ratio, B/FMA | AMHV, moles | Solvent, 30 ml. | Weight polymer, g. | Yield, percent |
|---|---|---|---|---|---|---|---|---|---|
| 1 | 10.8 | 0.2 | 2.73 | 0.01 | 20/1 | 0.00606 | Dioxane | 7.0 | 52 |
| 2 | 5.4 | 0.1 | 5.46 | 0.02 | 5/1 | 0.00312 | do | 5.48 | 50 |
| 3 | 19.0 | 0.352 | 1.0 | 0.0036 | 98/1 | 0.0107 | do | 11.8 | 59 |
| 4 | 18.0 | 0.33 | 2.0 | 0.0073 | 45/1 | 0.0103 | do | 10.8 | 54 |
| 5 | 17.0 | 0.31 | 3.0 | 0.011 | 28/1 | 0.0098 | do | 9.8 | 49 |
| 6 | 15.0 | 0.28 | 5.0 | 0.018 | 15.5/1 | 0.009 | do | 11.7 | 58 |

TABLE II.—PHYSICAL PROPERTY DATA FOR BUTADIENE-FMA COPOLYMERS

| No. | Molecular weight | Weight percent OH* Found | Weight percent OH* Calc'd | Percent Fe** Found | Percent Fe** Calc'd |
|---|---|---|---|---|---|
| 1 | 3,900 | 1.10 | 0.87 | 2.8 | 4.1? |
| 2 | 3,000 | 0.70 | 1.13 | 7.7 | 10.3? |
| 3 | 3,000 | 1.25 | 1.13 | 0.74 | 1.0? |
| 4 | 3,200 | 1.28 | 1.06 | 1.47 | 2.0? |
| 5 | 3,300 | 1.19 | 1.03 | 3.02 | 3.1? |
| 6 | 2,400 | 1.08 | 1.42 | 4.42 | 5.0? |

*Calculated OH weight percent made on the basis of two OH group per chain for the molecular weight values reported.
**Calculated Fe content made on the basis of the ratio of comonomers initially charged into the reactor.

TABLE III.—BURNING RATE DATA ON COPOLYMER OF BUTADIENE-FMA IN PROPELLANT FORMULATION

| No. | Weight percent FMA | Percent Fe in copolymer | Burning rate (in./sec.) at— 800–835 p.s.i. | Burning rate (in./sec.) at— 1,600–1,620 p.s.i |
|---|---|---|---|---|
| 3 | 5 | 0.74 | 0.580 | 0.91 |
| 4 | 10 | 1.47 | 0.594 | 0.92 |
| 5 | 15 | 3.02 | 0.632 | 0.93 |
| 6 | 25 | 4.42 | 0.690 | 1.00 |
| Standard | 0.0 | 0.0 | 0.493 | 0.81 |

The burning rates for samples Nos. 3, 4, 5, and 6, listed in Table III, are for a propellant formulation comprising butadiene-ferrocenyl methyl acrylate copolymer 10.0 weight percent, isodecyl pelargonate plasticizer 10.0 weight percent, isodecyl pelargonate plasticizer 10.0 weight percent, metal additive (aluminum powder) 10.0 weight percent, and inorganic oxidizer (ammonium perchlorate) 70 weight percent. The copolymer contained in the propellant composition can be varied from about 5 weight percent to about 30 weight percent, the metal additive from about 5 to about 20 weight percent, the plasticizer from about 5 to about 30 weight percent, and the inorganic oxidizer from about 10 to about 72 weight percent. Other plasticizers may be used with the copolymers of this invention. Among the important plasticizers are nonvolatile organic liquids or low melting solids, especially the phthalic, adipate and sebacate esters, and aryl phosphate esters.

We claim:

1. The hydroxy-terminated copolymers of butadiene and ferrocenyl methyl acrylate prepared by reacting ferrocenyl methyl acrylate and a suitable polymerization initiator in an inert organic solvent with butadiene at a reaction temperature and for a reaction time period sufficient for said reaction to take place after which solvent removal is effected and said copolymers are dried at a suitable drying temperature while under reduced pressure; said initiator being selected from azo-bis-(2-methyl - 5 - hydroxyvaleronitrile), azo-bis-(2 - methyl - 3 - hydroxypropionitrile), and azo-bis(hydroxyethyl - 2 - methyl propionate); said inert organic solvent being selected from toluene, dioxane, and dimethyl formamide; said reaction temperature being in the range of about 60° C. to about 80° C.; said reaction time being from about 24 hours to about 120 hours; said drying is accomplished at a suitable temperature in the range of about 70° C. to about 75° C. and said reduced pressure is in the range of about 1 millimeter; said copolymers being characterized by a molecular weight in the range from about 1000 to about 10,000, hydroxy-end group content of about 0.1 weight percent to about 2.5 weight percent, and an iron content of about 0.74 percent weight percent to about 12.0 weight percent.

2. The copolymers of claim 1 formed by reacting butadiene and ferrocenyl methyl acrylate in weight ratio from about 19:1 to about 1:3.

References Cited

UNITED STATES PATENTS 3,412,079  11/1968  Halasa et al. _____ 260—83.5 X
3,598,850   8/1971  Dewey _____ 260—439 CY

OTHER REFERENCES

Pittman et al., Polymerization of Ferrocenylmethylacrylate and Ferrocenylmethyl Methacrylate, Macromolecules, vol. 3, pp. 746 to 754, Nov.-Dec. (1970) QD380M3.

LELAND A. SEBASTIAN, Primary Examiner

U.S. Cl. X.R.

149—19.9, 44; 260—439 CY